(12) United States Patent
Beaumont et al.

(10) Patent No.: US 11,411,605 B2
(45) Date of Patent: Aug. 9, 2022

(54) MEASUREMENT METHOD

(71) Applicant: British Telecommunications Public Limited Company, London (GB)

(72) Inventors: Stephen Beaumont, London (GB); Jonathan Hitchen, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 16/498,202

(22) PCT Filed: Apr. 3, 2018

(86) PCT No.: PCT/EP2018/058422
§ 371 (c)(1),
(2) Date: Sep. 26, 2019

(87) PCT Pub. No.: WO2018/178388
PCT Pub. Date: Oct. 4, 2018

(65) Prior Publication Data
US 2020/0382161 A1  Dec. 3, 2020

(30) Foreign Application Priority Data

Mar. 30, 2017 (EP) ................................. 17163913

(51) Int. Cl.
*H04B 3/46* (2015.01)
*H04B 3/48* (2015.01)
(Continued)

(52) U.S. Cl.
CPC .............. *H04B 3/48* (2013.01); *H04M 3/247* (2013.01); *H04M 3/305* (2013.01); *H04M 2201/18* (2013.01)

(58) Field of Classification Search
CPC .. H04M 3/305; H04M 2201/18; H04M 3/247; H04B 3/46; H04B 3/48
See application file for complete search history.

(56) References Cited

U.S. PATENT DOCUMENTS 9,614,734 B1 * 4/2017 Lazarescu ............. H04W 24/08
2002/0138443 A1  9/2002 Schran et al.
(Continued)

FOREIGN PATENT DOCUMENTS

EP    3046358 A1    12/2006
EP    1843564 A1    10/2007
(Continued)

OTHER PUBLICATIONS

PCT International Search Report for International Application No. PCT/EP2018/058422, dated Jun. 27, 2018, 3 pages.
(Continued)

*Primary Examiner* — Steven H Nguyen
(74) *Attorney, Agent, or Firm* — Patterson Thuente Pedersen, P.A.

(57) ABSTRACT

The present disclosure provides a method of measuring the effectiveness of an intervention in a hybrid fiber-metal access network. The effectiveness measure is determined in accordance with the improvement in the attenuation and the maximum achievable data rate. The effectiveness measure is used to determine whether a further network intervention is required.

9 Claims, 4 Drawing Sheets

(51) Int. Cl.
*H04M 3/24* (2006.01)
*H04M 3/30* (2006.01)

(56) References Cited

U.S. PATENT DOCUMENTS

| | | | |
|---|---|---|---|
| 2004/0086086 A1 | 5/2004 | Butler et al. | |
| 2006/0039486 A1* | 2/2006 | Rhee | H04M 11/062 375/260 |
| 2007/0195705 A1* | 8/2007 | Shrikhande | H04L 43/0811 370/242 |
| 2007/0208537 A1* | 9/2007 | Savoor | H04M 3/30 702/182 |
| 2009/0074153 A1* | 3/2009 | Wu | H04M 3/306 379/1.04 |
| 2009/0225672 A1* | 9/2009 | Yi | H04M 3/304 370/252 |
| 2010/0097070 A1 | 4/2010 | Crick | |
| 2011/0149744 A1 | 6/2011 | Aboughanaima et al. | |
| 2013/0007441 A1 | 1/2013 | Stern et al. | |
| 2013/0070908 A1 | 3/2013 | Beaumont et al. | |
| 2013/0101093 A1 | 4/2013 | Tennyson et al. | |
| 2014/0198667 A1* | 7/2014 | Hatch | H04L 43/50 370/249 |
| 2015/0271035 A1* | 9/2015 | Colon | H04L 43/16 709/224 |
| 2015/0350015 A1 | 12/2015 | Clemm et al. | |
| 2021/0072097 A1* | 3/2021 | Trundle | G01R 22/06 |

FOREIGN PATENT DOCUMENTS

| | | |
|---|---|---|
| EP | 2112810 A1 | 10/2009 |
| EP | 2393212 A1 | 12/2011 |
| EP | 2 784 984 A1 | 10/2014 |
| GB | 2367971 A | 4/2002 |
| WO | WO 2001/076208 A1 | 10/2001 |
| WO | WO 2001/076209 A1 | 10/2001 |
| WO | WO 2002/080505 A1 | 10/2002 |
| WO | WO-2004086738 A2 | 10/2004 |
| WO | WO 2006/129145 A2 | 12/2006 |
| WO | WO 2006/129145 A3 | 12/2006 |
| WO | WO 2011/151614 A1 | 12/2011 |
| WO | WO 2012/156670 A1 | 11/2012 |

OTHER PUBLICATIONS

PCT Written Opinion of the ISA for International Application No. PCT/EP2018/058422, dated Jun. 27, 2018, 5 pages.
EP Search Report for EP application No. 17 16 3913, dated Sep. 25, 2017, 6 pages.
Combined Search and Examination Report for GB application No. 1705112.9, dated Sep. 22, 2017, 6 pages.
BT Suppliers' Information Note, "BT Metallic Path Facility Interface Description," (see also http://www.btwebworld.com/sinet/349v2p3.pdf), SIN 349, Nov. 2011, Issue 2.4, 12 pages.
International Preliminary Report on Patentability for Application No. PCT/EP2018/058422, dated Oct. 10, 2019, 7 pages.

* cited by examiner

MEASUREMENT METHOD

CROSS-REFERENCE TO RELATED APPLICATIONS

The present application is a National Phase entry of PCT Application No. PCT/EP2018/058422, filed Apr. 3, 2018, which claims priority from European Patent Application No. 17163913.1 filed Mar. 30, 2017, each of which is fully incorporated herein by reference.

TECHNICAL FIELD

The present disclosure relates to a method of determining the effectiveness of an intervention in a communications network, and in particular to a method of determining the effectiveness of an intervention in a hybrid copper-fiber access network.

BACKGROUND

Since the advent of the World Wide Web, there has been a need to provide internet access to customers at ever increasing data rates. Asymmetric Digital Subscriber Line (ADSL) technology over existing copper wires can provide data rates of up to 24 Mbit/s, but many customers will experience significantly lower data rates due to the length of the network connection. One solution is to install Fiber to the Premises (FTTP) networks, such as PONs (Passive Optical Networks), but this approach requires very significant investment.

Another approach is to install limited amounts of optical fiber and to utilize it in conjunction with the legacy copper cabling. FIG. 1 shows a schematic depiction of a hybrid fiber-copper access network 100 in which a telephone exchange 110 is connected to a plurality of customer premises 500 (the customer premises may be domestic, commercial or industrial premises). One network architecture is Fiber to the Cabinet (FTTC [or FTTCab]), in which the telephone exchange 110 is connected to cabinets 120 by optical fiber cable 115. VDSL (Very-high-bit-rate Digital Subscriber Line) data signals can be transmitted over the fiber cable to equipment in the cabinet which converts the optical signal to an electrical signal which can then be transmitted over a copper cable 125 to the customer premises 500. The customer premises are connected to the cabinet via a distribution point 130, which is typically located near to the customer premises, for example at a telephone pole. The distribution point is typically connected to the customer premises 500 using a dropwire 135, via a telephone pole (not shown). VDSL systems are capable of providing downstream data rates of up to 80 Mbit/s. Higher data rates, of up to 500 Mbit/s, can be obtained using G.fast transmission systems, which operate in a similar manner to VDSL.

The testing of copper access networks to locate faults or determine whether a copper line can support telephony and/or ADSL signals is well known: see, for example the Applicant's earlier international patent applications: WO01/76208, WO01/76209, WO02/080505, WO2011/151614 & WO2012/156670. However, the use of FTTC networks and VDSL transmission technology mean that these techniques are of less use, due to the increased data rates and the higher frequency bands that VDSL systems use, and thus new measurement techniques are required.

SUMMARY

According to a first aspect of the disclosure, there is provided a method of determining the effectiveness of an intervention on a hybrid copper-fiber access network, the method comprising: a) determining a value for the maximum achievable data rate (MAR1) before the intervention; b) determining a value for the attenuation (ATT1) before the intervention; c) determining a value for the maximum achievable data rate (MAR2) after the intervention; d) determining a value for the attenuation (ATT2) after the intervention; e) determining an effectiveness score (E) for the intervention based on the determined values of maximum achievable data rate (MAR1, MAR2) and attenuation (ATT1, ATT2); and f) determining whether a further intervention is required in accordance with the effectiveness score determined in e).

In e) the effectiveness score (E) may be determined based on i) the ratio of the maximum achievable data rate (MAR2) after the intervention to the maximum achievable data rate (MAR1) before the intervention; and ii) the ratio of the attenuation (ATT1) before the intervention to the ratio of the attenuation (ATT2) after the intervention. Specifically, the effectiveness score (E) is determined in accordance with:

$$E = \sqrt{\left[\left(\frac{MAR2}{MAR1}\right)^2 + \left(\frac{ATT1}{ATT2}\right)^2\right]}$$

The effectiveness score may be compared with one or more predetermined threshold values. The intervention may be determined to have a negative effect if the effectiveness score is less than a first predetermined threshold value: in such a case one or more further interventions by an engineer may be mandated. The intervention may be determined to have a positive effect if the effectiveness score is greater than a second predetermined threshold value and in such a case no further intervention may be necessary. The intervention may be determined to have negligible effect if the effectiveness score is greater than the first predetermined threshold value and less than the second predetermined threshold value. In such a case one or more further interventions may be required.

The values of maximum achievable data rate (MAR1, MAR2) and attenuation (ATT1, ATT2) are measured by an operational support system. Such an operational support system may calculate the effectiveness score on the basis of the measured values of maximum achievable data rate (MAR1, MAR2) and attenuation (ATT1, ATT2). The calculated effectiveness score is transmitted to a mobile terminal.

According to a second aspect of the disclosure, there is provided a test apparatus comprising a processor, data storage and memory, wherein the test apparatus is configured to perform the method as described above. The test apparatus may be further configured to i) store values for the maximum achievable data rate (MAR1) before the intervention and the attenuation (ATT1) before the intervention; ii) measure values for the maximum achievable data rate (MAR2) after the intervention and the attenuation (ATT2) after the intervention; and iii) calculate the effectiveness score (E) based on the determined values of maximum achievable data rate (MAR1, MAR2) and attenuation (ATT1, ATT2).

According to a third aspect of the disclosure, there is provided a data carrier device comprising computer executable code for performing any of the methods as described above.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
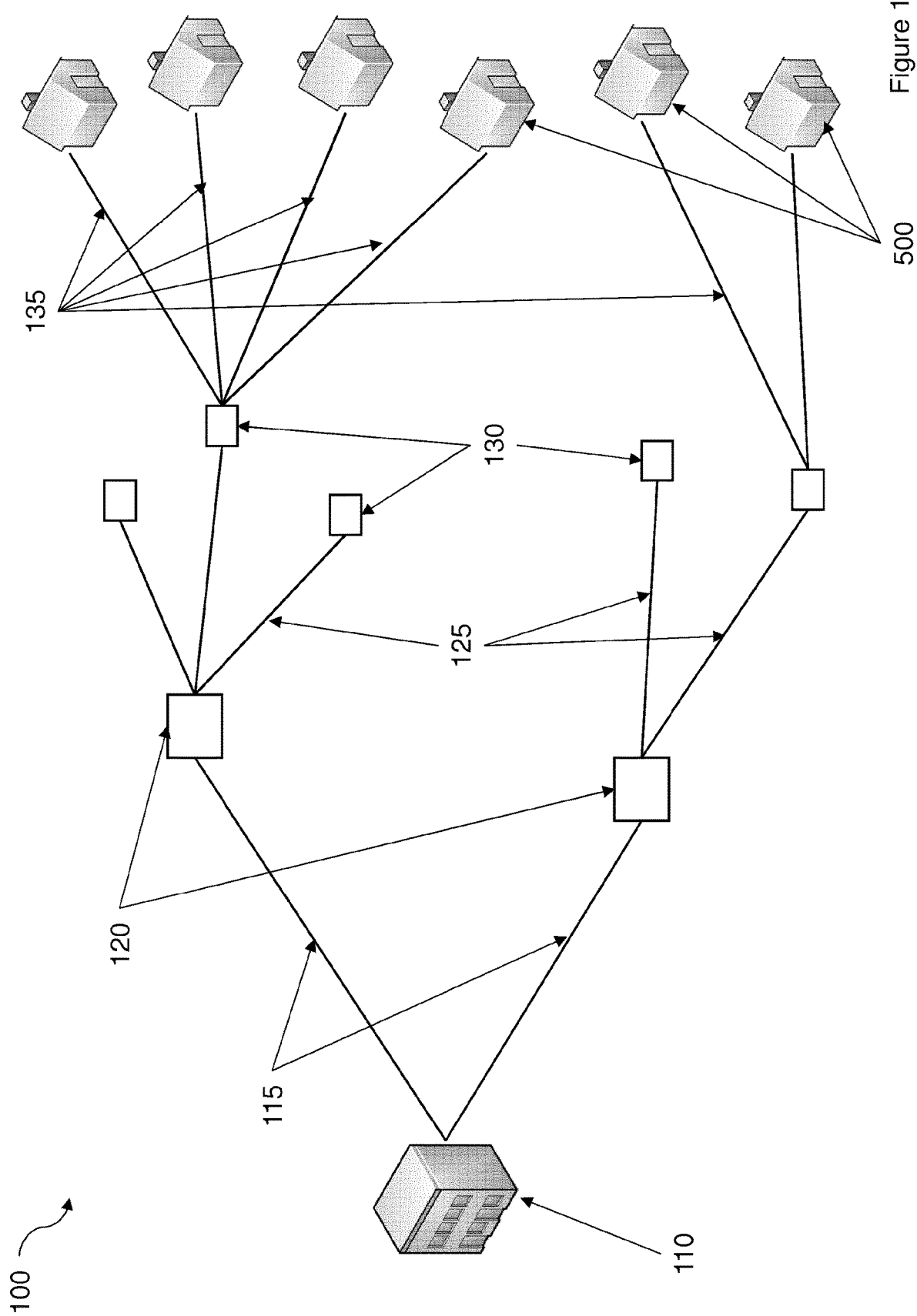
FIG. 1 shows a schematic depiction of a hybrid fiber-copper access network.
Figure 2:
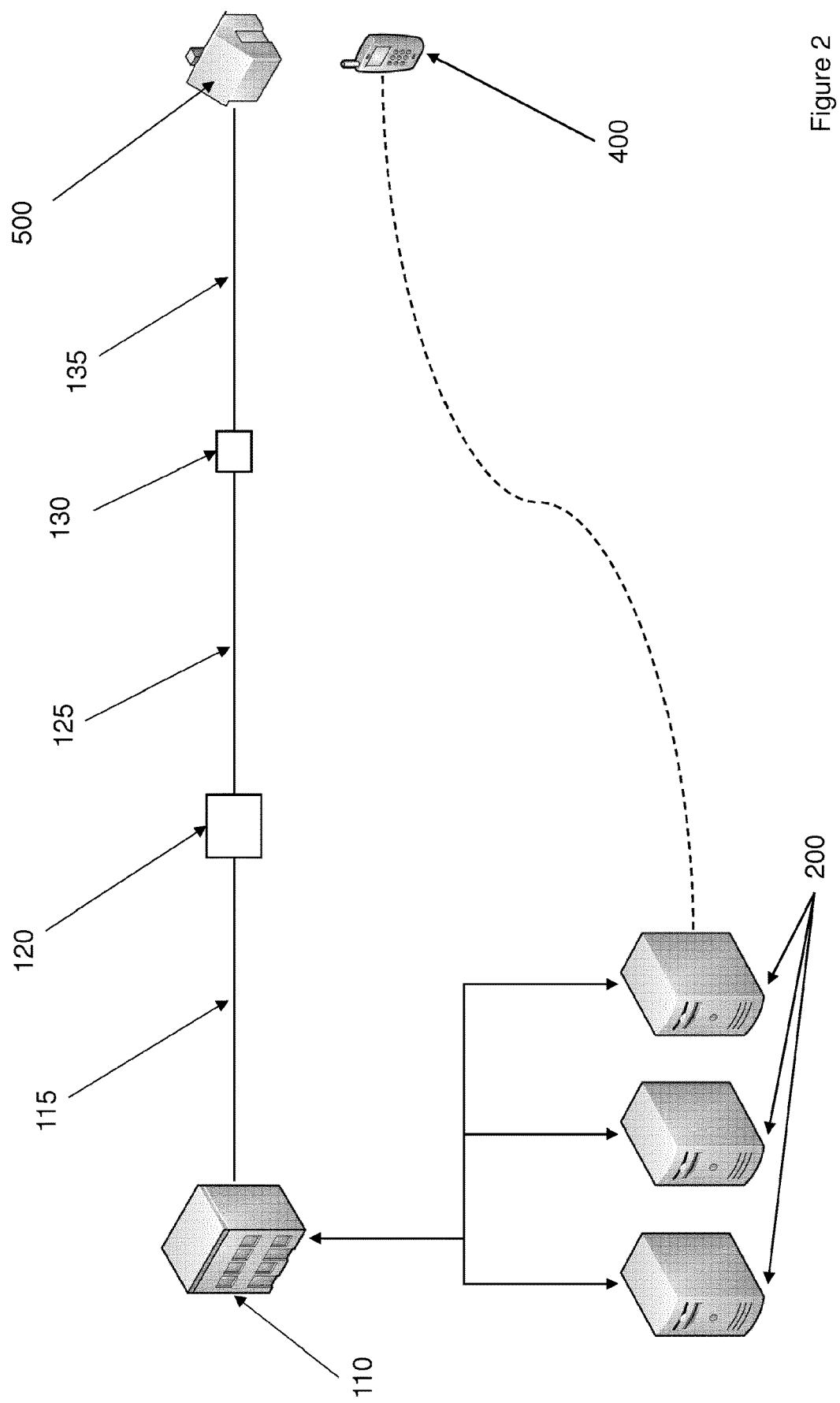
FIG. 2 shows a schematic depiction of a single line from the hybrid copper-fiber access network.

FIG. 2 shows a schematic depiction of a single line from hybrid copper-fiber access network 100, which connects the exchange building 110 to the customer premises 500. The connection comprises optical fiber cable 115, cabinet 120, copper cable 125, distribution point 130 and dropwire 135. The network 100 further comprises a plurality of operational support systems (OSSs) 200. The OSSs, amongst other functionality, store data concerning the state and/or performance of each network line and the components which constitute the network.

An OSS will store, amongst other data, a number of parameters relating to the transmission performance of each line. For example, an OSS will store for each line the data rate, the maximum achievable date rate, the attenuation and the signal to noise ratio (SNR) for both the upstream and the downstream connections. VDSL systems use a technique known as Dynamic Line Management (DLM) which assesses the performance of each VDSL circuit. Referring to FIG. 2, it will be understood that the metallic cable 125 connecting the cabinet 120 with the distribution point may support multiple VDSL circuits. The VDSL signals may create electromagnetic interference (EMI) which can cause errors in the adjacent circuits. Therefore, the use of DLM may result in a VDSL circuit being operated at a data rate which is less than the maximum achievable data rate (MAR) in order to obtain a greater degree of stability or a lower error rate. The DLM system will observe the operation of a VDSL line for at least several days before selecting a profile which will be used. Therefore, if an engineer makes a repair to a VDSL line it cannot be determined at the time that the repair is made what the effect of the repair is. Therefore, there is a need for a test that can be performed by an engineer following a repair, or other form of intervention, which can provide an indication of the effectiveness of that intervention.

As discussed above, the OSS hold parameter values for, amongst other parameters, the data rate, the maximum achievable date rate, the attenuation and the signal to noise ratio (SNR). These four different metrics are inter-related and thus it is not possible to construct a useful performance measure based on only one of them. As the use of DLM may lead to the value of the data rate being capped in order to provide a more stable connection, it was decided to study the maximum achievable date rate, attenuation and SNR.

Historic data was obtained from the OSS operated by the applicant and analyzed to determine the value of a computed metric to whether:

A repair task resulted in a repeat fault being raised, or

How the downstream data rate (measured after the DLM had settled) compared to the downstream data rate when the fault was raised.

Figure 3:
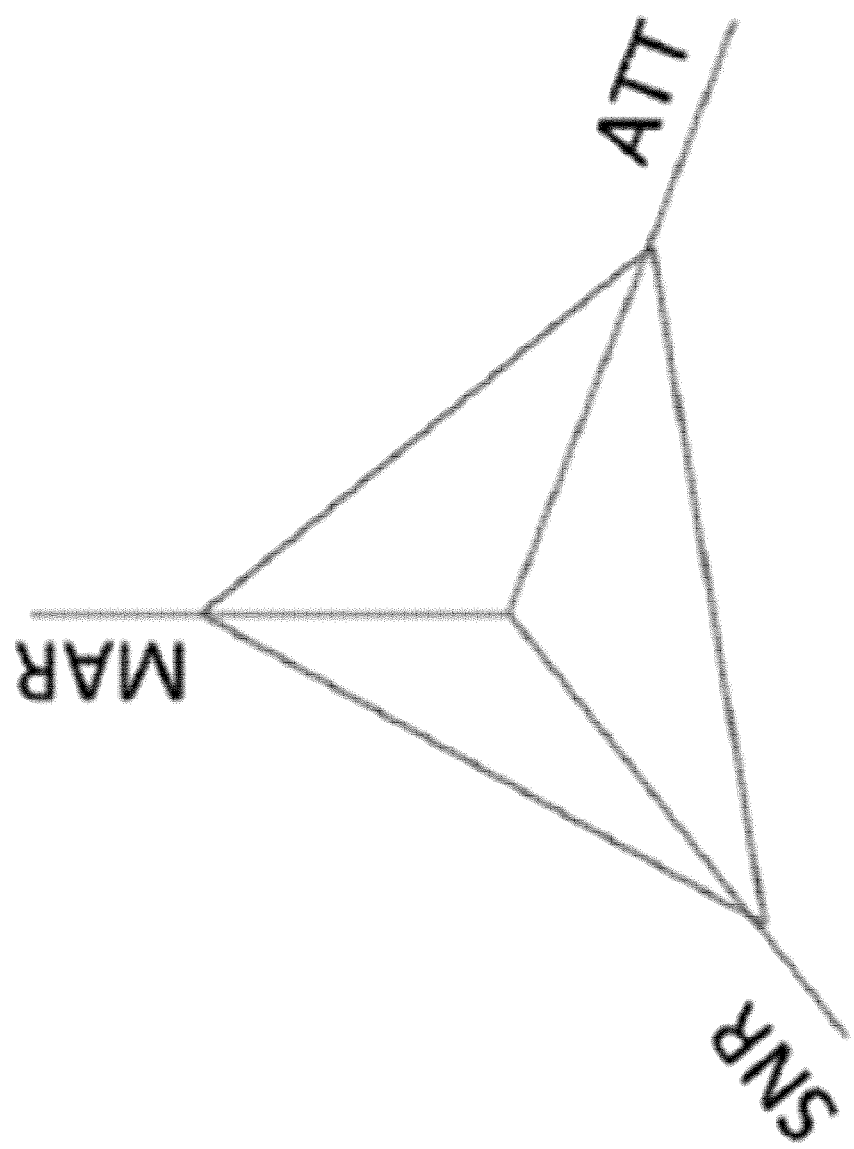
FIG. 3 shows a relationship between a downstream maximum achievable data rate (MAR), a downstream attenuation (ATT), and a signal to noise ration (SNR).

It was found that the most significant parameters were the downstream maximum achievable data rate (MAR) and the downstream attenuation (ATT) and that the relationship between these parameters was best described as being orthogonal, as depicted in FIG. 3. That is, each of these parameter values can be considered as representing one of the shorter sides of a right-angled triangle and that the effectiveness measure could be determined on the basis of:

the length of the hypotenuse of that right-angled triangle, the area of that right-angled triangle, or the area of the rectangle defined by the shorter sides of such a triangle, or any other equivalent measure.

One method of calculating the effectiveness measure, E, is described using the formula:

$$E = \sqrt{\left[\left(\frac{MAR2}{MAR1}\right)^2 + \left(\frac{ATT1}{ATT2}\right)^2\right]} \quad [1]$$

where:

MAR1 is the value for the downstream maximum achievable data rate before the intervention;

ATT1 is the value for the downstream attenuation before the intervention;

MAR2 is the value for the downstream maximum achievable data rate after the intervention; and ATT2 is the value for the downstream attenuation after the intervention.

It should be noted that by using ratios of the two parameters before and after the intervention, any influences on the parameter values which are due to the length of the line under test are removed and thus the values of effectiveness measures determined for different lines can be compared. It will be noted that the second ratio in equation [1] is inverted in relation to the first ratio as an improvement in the attenuation will lead to a lower numerical attenuation value.

Threshold values for the effectiveness measure can be pre-determined such that the effectiveness measure calculated for a particular network repair or intervention can be compared with the effectiveness measure threshold values and the effectiveness of the intervention can be categorized. For example, by defining a lower and a higher threshold value, if a calculated effectiveness measure is less than the lower threshold then the intervention can be categorized as having a negative impact (that is, worsening the performance of the network). If the calculated effectiveness measure is greater than the upper threshold then the intervention can be categorized as having a positive impact (that is improving the performance of the network). If the calculated effectiveness measure is greater than the lower threshold but lower than the upper threshold then the intervention can be categorized as having negligible effect (that is, the network performance has not changed significantly). It will be understood that it will be possible to use a different number of thresholds in order to provide a different categories which can be used to describe the effects of the intervention.

Figure 4:
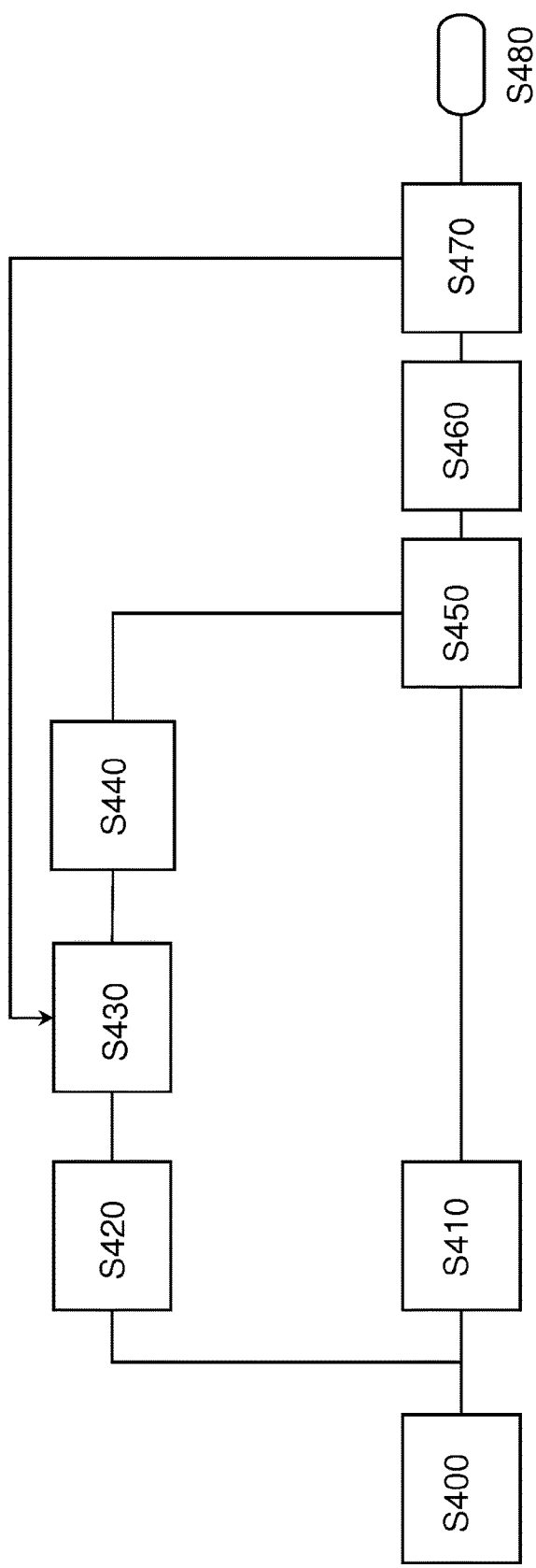
FIG. 4 shows a graphical depiction of a flowchart describing the operation of a method according to the present disclosure.

FIG. 4 shows a graphical depiction of a flowchart describing the operation of a method according to the present disclosure invention. At S400 a fault is reported and in response an engineer is assigned to investigate the fault (S420) and the most recent parameter values (for example, parameter values for the downstream maximum achievable data (MAR1) and the downstream attenuation (ATT1) before the intervention) are recovered (S410). The engineer will use their skill and expertise to diagnose the fault and then perform an appropriate intervention (S430). Following the intervention, the parameter values (i.e. downstream maximum achievable data (MAR2) and the downstream attenuation (ATT2) after the intervention) are measured again (S440) and an effectiveness measure calculated on the basis of the four parameter values (S450). An indication of the effectiveness of the intervention can then be provided to the engineer (S460) who then decides at S470 if any further intervention is required (returning to S430). For example, based on the categorization scheme described above, if the intervention is categorized as having a negative impact then the engineer must perform one or more further interventions. If the intervention is categorized as having no impact then the engineer should consider a different intervention as the reported fault condition may still be present. If the intervention is categorized as having a positive impact then the engineer may not need to make any further intervention and thus the process can terminate (S480).

Referring to FIG. 2, the measurements made after the intervention need to be made at the customer premises such that the downstream parameters can be measured properly. The engineer will be provided with test apparatus 400 which is able to measure the downstream maximum achievable data (MAR2) and the downstream attenuation (ATT2) after the intervention. These parameter values may be reported to the OSS 200 (for example, via a wireless data connection) such that the OSS calculates the effectiveness measure and sends a message, such as an SMS or MMS, to the engineer to communicate the effectiveness measure. Rather than communicating the calculated value of the effectiveness measure the OSS may transmit the category which is relevant to the effectiveness of the intervention and any other further information which may assist the engineer in making a further intervention. Alternatively, when the engineer is assigned the repair task, the parameter values for the downstream maximum achievable data (MAR1) and the downstream attenuation (ATT1) before the intervention for the line in question may be downloaded to the test apparatus 400 such that when the downstream maximum achievable data (MAR2) and the downstream attenuation (ATT2) are measured after the intervention the test apparatus is able to calculate the effectiveness measure, categorize the effectiveness measure and then display the relevant information to the engineer.

VDSL2 systems are used to provide applications and services to customers which require relatively high data rates, such as streaming video, IPTV transmissions, downloads of operating systems, online gaming, etc. In most cases the requirement is greater for transmitting data in the downstream direction, that is from the local exchange to the customer premises, than it is for transmitting data in the upstream direction, that is from the customer premises to the local exchange. Thus, the foregoing discussion is focused on determining the effectiveness of an intervention based on measurements of downstream parameters made at the customer premises. However, it should be understood that it would also be possible to determine the effectiveness of an intervention based on measurements of upstream parameters made at the local exchange.

As embodiments of the present disclosure can be implemented using an appropriately configured and programmed test apparatus, appropriate computer code may be accessed via download, for example via the internet from an ISP, or on some physical media, for example, DVD, CD-ROM, USB memory stick, etc., for which the test apparatus has an appropriate media reader.

According to one aspect, the present disclosure provides a method of measuring the effectiveness of an intervention in a hybrid fiber-metal access network. The effectiveness measure is determined in accordance with the improvement in the attenuation and the maximum achievable data rate. The effectiveness measure is used to determine whether a further network intervention is required.

The invention claimed is:

1. A method of determining an effectiveness of an intervention on a hybrid copper-fiber access network, the method comprising:

determining a value for a maximum achievable data rate before the intervention (MAR1);

determining a value for an attenuation before the intervention (ATT1);

determining a value for a maximum achievable data rate after the intervention (MAR2);

determining a value for an attenuation after the intervention (ATT2);

determining an effectiveness score (E) for the intervention based on:

a ratio of MAR2 to MAR1; and a ratio of ATT1 to ATT2; and determining whether a further intervention is required in accordance with the determined E.

2. The method according to claim 1, wherein E is determined in accordance with:

$$E = \sqrt{\left[\left(\frac{MAR2}{MAR1}\right)^2 + \left(\frac{ATT1}{ATT2}\right)^2\right]}.$$

3. The method according to claim 1, wherein E is compared with one or more predetermined threshold values.

4. The method according to claim 3, wherein the intervention is determined to have a negative effect if E is less than a first predetermined threshold value.

5. The method according to claim 3, wherein the intervention is determined to have a positive effect if E is greater than a second predetermined threshold value.

6. The method according to claim 3, wherein the intervention is determined to have negligible effect if E is greater than the first predetermined threshold value and less than the second predetermined threshold value.

7. The method according to claim 1, wherein MAR1, MAR2, ATT1, and ATT2 are measured by an operational support system.

8. The method according to claim 7, wherein the operational support system calculates E on the basis of the measured values of MAR1, MAR2, ATT1, and ATT2.

9. The method according to claim 8, wherein the calculated E is transmitted to a mobile terminal.

* * * * *

UNITED STATES PATENT AND TRADEMARK OFFICE
CERTIFICATE OF CORRECTION

PATENT NO. : 11,411,605 B2
APPLICATION NO. : 16/498202
DATED : August 9, 2022
INVENTOR(S) : Stephen Beaumont et al.

It is certified that error appears in the above-identified patent and that said Letters Patent is hereby corrected as shown below:

In the Specification

In Column 3, Line 14, delete "ration" and insert -- ratio --, therefor.

In Column 3, Line 34, delete "date rate," and insert -- data rate, --, therefor.

In Column 3, Line 58, delete "date rate," and insert -- data rate, --, therefor.

In Column 3, Line 64, delete "date rate," and insert -- data rate, --, therefor.

In Column 4, Line 64, delete "disclosure invention." and insert -- disclosure. --, therefor.

Signed and Sealed this
Fourth Day of April, 2023

Katherine Kelly Vidal
*Director of the United States Patent and Trademark Office*